(12) United States Patent
Kim (10) Patent No.: US 8,976,442 B2
(45) Date of Patent: Mar. 10, 2015

(54) ELECTRO-WETTING DISPLAY DEVICES

(71) Applicant: Electronics and Telecommunications Research Institute, Daejeon (KR)

(72) Inventor: Gi Heon Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 13/737,904

(22) Filed: Jan. 9, 2013

(65) Prior Publication Data

US 2013/0278990 A1  Oct. 24, 2013

(30) Foreign Application Priority Data

Apr. 23, 2012 (KR) .................. 10-2012-0042084

(51) Int. Cl.
*G02B 26/00* (2006.01)
*G02B 26/02* (2006.01)
*G09G 3/28* (2013.01)
*G02F 1/07* (2006.01)
*G09G 3/34* (2006.01)

(52) U.S. Cl.
CPC ............ *G02B 26/005* (2013.01); *G02B 26/004* (2013.01); *G09G 3/348* (2013.01); *G02B 26/02* (2013.01); *G09G 3/28* (2013.01); *G02F 1/07* (2013.01)
USPC ........... 359/290; 359/245; 359/253; 359/228; 345/60; 345/71

(58) Field of Classification Search
CPC ...... G02B 26/00; G02B 26/02; G02B 26/004; G02B 26/005; G02F 1/00; G02F 1/07; G09G 3/00; G09G 3/28; G09G 3/3433; G09G 3/348
USPC .................. 359/290–295, 298, 245, 253, 228; 345/55, 60, 61, 71, 83, 84; 516/198, 516/204
See application file for complete search history.

(56) References Cited

U.S. PATENT DOCUMENTS

| 7,760,420 B2 * | 7/2010 | Cheng et al. .................. 359/297 |
| 7,872,790 B2 * | 1/2011 | Steckl et al. .................. 359/253 |
| 8,059,328 B1 * | 11/2011 | Kuo et al. ..................... 359/290 |
| 2011/0157677 A1 | 6/2011 | Chen et al. |
| 2011/0157678 A1 | 6/2011 | Chen et al. |

FOREIGN PATENT DOCUMENTS

| KR | 10-2007-0097810 A | 10/2007 |
| KR | 10-2009-0026759 A | 3/2009 |

* cited by examiner

*Primary Examiner* — Loha Ben
(74) *Attorney, Agent, or Firm* — Rabin & Berdo, P.C.

(57) ABSTRACT

Electro-wetting display devices are disclosed. The electro-wetting display may include an upper structure and a lower structure opposite to each other, a hydrophobic insulating layer covering a bottom surface of the upper structure, hydrophilic partitions disposed between the hydrophobic insulating layer and the lower structure to define pixel regions, and a colorless conductive fluid and a colored non-conductive fluid filling each of the pixel regions. A specific gravity of the colored non-conductive fluid may be smaller than a specific gravity of the colorless conductive fluid.

18 Claims, 4 Drawing Sheets

ELECTRO-WETTING DISPLAY DEVICES

CROSS-REFERENCE TO RELATED APPLICATIONS

This U.S. non-provisional patent application claims priority under 35 U.S.C. §119 to Korean Patent Application No. 10-2012-0042084, filed on Apr. 23, 2012, the entirety of which is incorporated by reference herein.

BACKGROUND

The inventive concept relates to electro-wetting display devices and, more particularly, to electro-wetting display devices with improved electro-optical characteristic.

Electro-wetting display devices are attractive in industry because of excellent brightness, excellent contrast ratio, and low power consumption thereof. The electro-wetting display device includes two substrates and an electro-wetting element disposed between the two substrates. The electro-wetting element may reversibly control transmission and reflection of external light by an electric field generated between the substrates. The electro-wetting element may include a conductive fluid having a polar group and high transmission and colored nonpolar oil.

If the electric field is applied to the electro-wetting display device, the colored nonpolar oil disposed on a back substrate may contract aside or be divided into small particles and/or drops, the high transmission conductive fluid disposed on a front substrate may be in contact with a hydrophobic insulator. Thus, when light is irradiated to the front substrate, the light may pass through the high transmission conductive fluid, so as to be colorless. Additionally, the light may be reflected by a reflection plate disposed at a back side of the electro-wetting display device, so that the light may have a color. On the contrary, if the electric field is not applied to the electrode-wetting display device, the colored nonpolar oil may be in contact with the hydrophobic insulator. In this case, when the light is irradiated to the front substrate, the light may be reflected by the colored nonpolar oil, so that the electro-wetting display may be in color.

When the electric field is not applied to the electrode-wetting display device, the light irradiated to the front substrate may pass through the high transmission conductive fluid and then be reflected by the colored nonpolar oil disposed on the back substrate. The reflected light may be absorbed into the high transmission conductive fluid. Thus, a proceeding direction of the reflected light may be refracted, and crosstalk of the reflected light may occur in a boundary between pixels. As a result, resolution of an image and a color reproduction range may be reduced.

SUMMARY

Embodiments of the inventive concept may provide electro-wetting display devices with improved resolution and color reproduction range.

Embodiments of the inventive concept may also provide electro-wetting display devices having low power consumption.

In one aspect, an electro-wetting display device may include: an upper structure and a lower structure opposite to each other; a hydrophobic insulating layer covering a bottom surface of the upper structure; hydrophilic partitions disposed between the hydrophobic insulating layer and the lower structure to define pixel regions; and a colorless conductive fluid and a colored non-conductive fluid filling each of the pixel regions. A specific gravity of the colored non-conductive fluid may be smaller than a specific gravity of the colorless conductive fluid.

In some embodiments, the lower structure may include a lower substrate, a lower electrode disposed on a top surface of the lower substrate, and a lower insulating layer covering the lower electrode on the top surface of the lower substrate. The upper structure may include an upper substrate, an upper electrode disposed on a bottom surface of the upper substrate, and an upper insulating layer covering the upper electrode on the bottom surface of the upper substrate. The lower insulating layer of the lower structure and the upper insulating layer of the upper structure may face each other.

In other embodiments, the upper electrode may be disposed to correspond to each of the pixel regions.

In still other embodiments, the colorless conductive fluid may be deionized water including an electrolyte.

In even other embodiments, the electrolyte may include one of $KCl$, $HCl$, $NaCl$, $HNO_3$, $NaOH$, $Ch_3COOK$, $Ba(OH)_2$, $CuSO_4$, $H_2S$, $H_2CO_3$, $HgCl_2$, $CH_3COOH$, $H_2SO_4$, and $KOH$.

In yet other embodiments, the colorless conductive fluid may include a mixed fluid of a polar organic solvent and a lithium-salt-based material.

In yet still other embodiments, the polar organic solvent may include one of ethylene carbonate, propylene carbonate, dimethyl carbonate, and diethyl carbonate.

In further embodiments, the colored non-conductive fluid may be oil including an artificial dye or a natural dye.

In still further embodiments, the hydrophilic partitions may be formed of at least one of epoxy resin, polyvinyl alcohol, polyvinyl Acetate, polyvinyl pyrrolidone, cellulose, and polyacrylate.

In even further embodiments, the electro-wetting display device may further include: a light emitting element disposed on a bottom surface of the lower substrate; and a reflecting plate under the light emitting element. The colored non-conductive fluid in each of the pixel regions may have one of a red color, a green color, and a blue color.

In yet further embodiments, the electro-wetting display device may further include: an adhesive layer disposed between the light emitting element and the reflecting plate.

In yet further embodiments, the light emitting element may be disposed to correspond to the colored non-conductive fluid in each of the pixel regions; and the light emitting element may have the same color as the colored non-conductive fluid corresponding thereto.

In yet further embodiments, the light emitting element may be a color light emitting element.

In yet further embodiments, the light emitting element may be a white light emitting element.

In another aspect, an electro-wetting display device may include: a light emitting element; a lower structure disposed on the light emitting element, the lower structure including a lower substrate, a lower electrode disposed on the lower substrate, and a lower insulating layer covering the lower electrode; an upper structure opposite to the lower structure, the upper structure including an upper substrate disposed on the upper substrate, and an upper insulating layer covering the upper electrode; hydrophilic partitions disposed between the lower structure and the upper structure and defining pixel regions; and a colorless conductive fluid and a colored non-conductive fluid filling each of the pixel regions.

In some embodiments, the hydrophilic partitions may be formed of at least one of epoxy resin, polyvinyl alcohol, polyvinyl Acetate, polyvinyl pyrrolidone, cellulose, and polyacrylate.

In other embodiments, the light emitting element may be a color light emitting element.

In still other embodiments, the light emitting element may be a white light emitting element.

BRIEF DESCRIPTION OF THE DRAWINGS

The inventive concept will become more apparent in view of the attached drawings and accompanying detailed description.

DETAILED DESCRIPTION OF THE EMBODIMENTS

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 1:
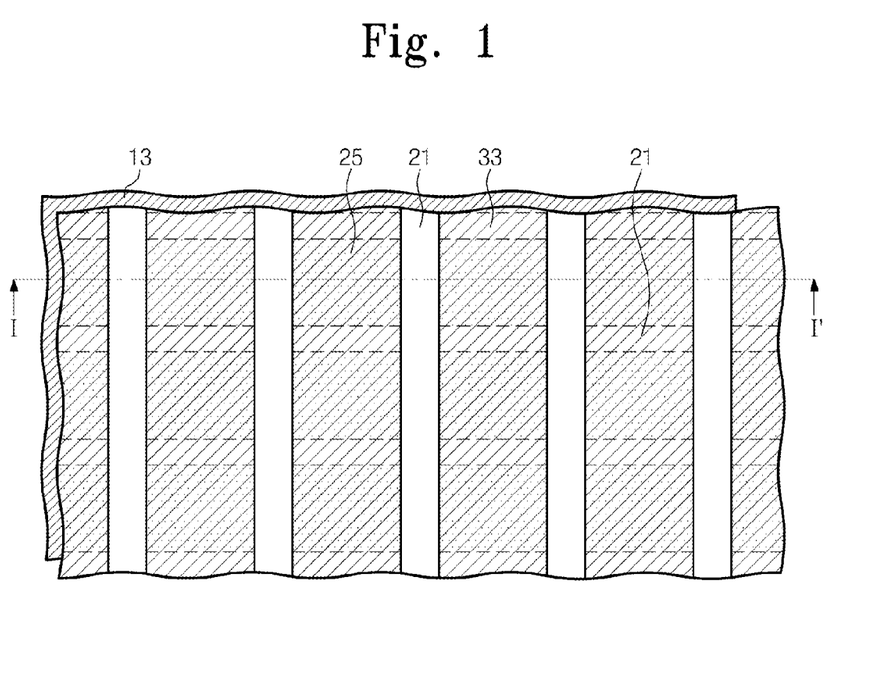
FIG. 1 is a plan view illustrating an electro-wetting display device according to some embodiments of the inventive concept.
Figure 2:
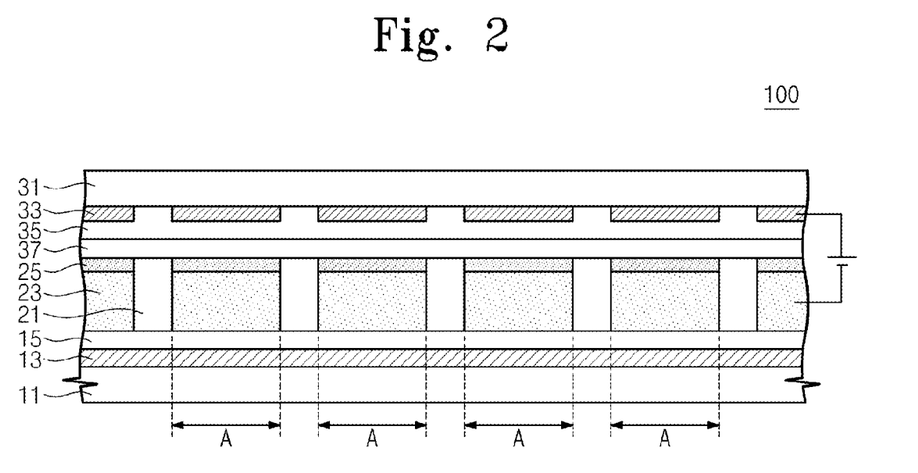
FIG. 2 is a cross-sectional view taken along a line I-I' of FIG. 1.

FIG. 1 is a plan view illustrating an electro-wetting display device according to some embodiments of the inventive concept. FIG. 2 is a cross-sectional view taken along a line I-I'of FIG. 1.

Referring to FIGS. 1 and 2, an electro-wetting display device 100 may include a lower substrate 11 and an upper substrate 31 spaced apart from the lower substrate 11. A lower electrode 13 and a lower insulating layer 15 may be sequentially stacked on a top surface of the lower substrate 11. An upper electrode 33 may be disposed on a bottom surface of the upper substrate 31, and a hydrophobic insulating layer 37 may be disposed under the upper electrode 33. An upper insulating layer 35 may be disposed between the upper electrode 33 and the hydrophobic insulating layer 37. The lower insulating layer 15 and the upper insulating layer 35 may respectively cover the lower electrode 13 and the upper electrode 33 for electrical interruption of the lower electrode 13 and the upper electrode 33. Hydrophilic partitions 21 defining pixel regions A may be disposed between the lower insulating layer 15 and the hydrophobic insulating layer 37. The hydrophilic partitions 21 may be spaced apart from each other by equal intervals between the lower insulating layer 15 and the hydrophobic insulating layer 37. A colorless conductive fluid 23 and a colored non-conductive fluid 25 may fill the pixel region A. The colored non-conductive fluid 25 has a smaller specific gravity than the colorless conductive fluid 23.

Each of the lower substrate 11 and the upper substrate 31 may be a transparent glass substrate or a transparent plastic substrate.

Pattern-shapes of the lower electrode 13 and the upper electrode 33 may be changed depending on a driving method of the electro-wetting display device 100. If the electro-wetting display device 100 is an active electro-wetting display device, the lower electrode 13 may be a pattern-less shape, and the upper electrode 33 may be disposed on a portion of the bottom surface of the upper substrate 31 which corresponds to the pixel region A defined between the hydrophilic partitions 21 as illustrated in FIG. 2. Alternatively, even though not shown in the drawings, the lower electrode 13 may have a line shape and the upper electrode 33 may have a line shape crossing the lower electrode 13 if the electro-wetting display device 100 is a passive electro-wetting display device. The lower and upper electrodes 13 and 33 may be formed of a transparent conductive material. For example, the lower and upper electrodes 31 and 33 may be formed of at least one of ITO, ZnO:Al, ZnO:Ga, $SnO_2$:F, a conductive polymer, and carbon nanotube (CNT).

The lower and upper insulating layers 15 and 35 may be formed of a transparent organic material or a transparent inorganic material. For example, the transparent organic material may be a polymer including at least one of polyimide, polyacrylate, polyxylene, polystyrene, polyamide, polysiloxane, fluorocarbonresin, and polyvinylchloride. For example, the transparent inorganic material may include at least one of SiC, SiON, SiO, AlO, SiN, and AlON.

Since the hydrophobic insulating layer 37 is in contact with the colored non-conductive fluid 25, the hydrophobic insulating layer 37 may have an interface property similar to that of the colored non-conductive fluid 25. The hydrophobic insulating layer 37 may be formed of a fluorine-based polymer. For example, the fluorine-based polymer may include at least one of poly(tetrafluoroethylene), poly(trifluoroethylene), and poly(difluoroethylene).

Each of the hydrophilic partitions 21 may have a thickness within a range of about 2 μm to about 100 μm. A shape and a height of each of the hydrophilic partitions 21 may be variously changed as the need arises. The hydrophilic partitions 21 may be formed of a hydrophilic material. For example, the hydrophilic partitions 21 may be formed of a polymer including at least one of epoxy resin, polyvinyl alcohol, polyvinyl Acetate, polyvinyl pyrrolidone, cellulose, and polyacrylate. A polymer thin layer including the above polymer may be formed on the hydrophobic insulating layer 37 and then a lithography process may be performed on the polymer thin layer to form the hydrophilic partitions 21. At least one initiator and a thermal hardener may be added to reactive monomers and reactive oligomers of the polymer thin layer in the lithography process. The at least one initiator may include a photo initiator, a thermal initiator, and an initiator for oxidation-reduction reaction.

The photo initiator used in the lithography process may include one of 1-hydroxy-cyclohexyl-phenyl-ketone (Irgacure 907), 2-methyl-1[4-(methylthio)phenyl]-2-morpholinopropane-1-one (Irgacure 184C), 2-Hydroxy-2-methyl-1-phenyl-propane-1-one (Darocur 1173), a mixed initiator (Irgacure 500) of Irgacure 184C of 50 wt % and benzophenone of 50 wt %, a mixed initiator (Irgacure 1000) of Irgacure 184C of 20 wt % and Irgacure 1173 of 80 wt %, 2-hydroxy-1-[4-(2-hydroxyethoxy)phenyl]-2-methyl-1propanone (Irgacure 2959), methylbenzoylformate (Darocur MBF), alpha, alpha-dimethoxy-alpha-phenylacetophenone (Irgacure 651), 2-benzyl-2-(dimethylamino)-1-[4-(morpholinyl) phenyl]-1-butanone (Irgacure 369), a mixed initiator (Irgacure 1300) of Irgacure 369 of 30 wt % and Irgacure 651 of 70 wt %, diphenyl (2,4,6-trimethylbenzoyl)-phosphine oxide (Darocur TPO), a mixed initiator (Darocur 4265) of Darocur TPO of 50 wt % and Darocur 1173 of 50 wt %, phosphine oxide, phenyl bis(2,4,6-trimethyl benzoyl (Irgacure 819), a mixed initiator (Irgacure 2005) of Irgacure 819 of 5 wt % and Darocur 1173 of 95 wt %, a mixed initiator (Irgacure 2010) of Irgacure 819 of 10 wt % and Darocur 1173 of 90 wt %, a mixed initiator (Irgacure 2020) of Irgacure 819 of 20 wt % and Darocur 1173 of 80 wt %, bis(.eta.5-2,4-cyclopentadien-1-yl) bis [2,6-difluoro-3-(1H-pyrrol-1-yl)phenyl]titanium (Irgacure 784), or a mixed initiator (HSP 188) containing benzophenone.

The thermal-initiator used in the lithography process may include one of thermal-initiator may include benzoyl peroxide (BP), acetyl peroxide (AP), diauryl peroxide (DP), di-tert-butyl peroxide (t-BTP), cumylhydroperoxide (CHP), hydrogen peroxide (HP), potassium peroxide (PP), 2,2' Azobisisobutyronitrile (AIBN), azocompound, or silver alkyls.

The initiator for oxidation-reduction reaction used in the lithography process may include persulfate ($K_2S_2O_8$) or a redox initiator.

The colorless conductive fluid 23 and the colored non-conductive fluid 25 may not be mixed with each other. That is, the colorless conductive fluid 23 and the colored non-conductive fluid 25 may be separated from each other with an interface therebetween. Since the colored non-conductive fluid 25 has the smaller specific gravity than the colorless conductive fluid 23, the colored non-conductive fluid 25 may be disposed on the colorless conductive fluid 23 and be in contact with the hydrophobic insulating layer 37. Since the hydrophilic partitions 21 are formed of the hydrophilic material, the interface between the colored non-conductive fluid 25 and the colorless conductive fluid 23 may be substantially flat without a bend when the colored non-conductive fluid 25 is disposed on the colorless conductive fluid 23. If the partitions 21 are formed of a hydrophobic material, an interface between the colorless conductive fluid 23 and the colored non-conductive fluid 25 may be winding since a hydrophobic partition and the colorless conductive fluid 23 do not have interface affinity therebetween.

The colorless conductive fluid 23 may be transparent. The colored non-conductive fluid 25 may be oil including an artificial dye or a natural dye. The colored non-conductive fluid 25 may have various colors by the artificial dye or the natural dye.

A color of the colored non-conductive fluid 25 in one pixel region A may be different from a color of the colored non-conductive fluid 25 in another pixel region A. Alternatively, the colored non-conductive fluids 25 filling the pixel regions A different from each other may have the same color.

The colorless conductive fluid 23 may include a polar inorganic fluid or a polar organic fluid. The polar inorganic fluid may be deionized water including an electrolyte material. The electrolyte material may include one of KCl, HCl, NaCl, $HNO_3$, NaOH, $Ch_3COOK$, $Ba(OH)_2$, $CuSO_4$, $H_2S$, $H_2CO_3$, $HgCl_2$, $CH_3COOH$, $H_2SO_4$, and KOH. The polar organic material may be a mixed fluid of a polar organic solvent and a lithium-salt-based material. The polar organic solvent may include one of ethylene carbonate, propylene carbonate, dimethyl carbonate, and diethyl carbonate.

The lower electrode 13 may be electrically connected to a ground electrode (not shown). The upper electrode 33 may be connected to the colorless conductive fluid 23. If a voltage is not applied between the lower electrode 13 and the upper electrode 33, the colored non-conductive fluid 25 may be in contact with the hydrophobic insulating layer 37 and be disposed on the colorless conductive fluid 23.

In a general electro-wetting display device, a colored non-conductive fluid may have a greater specific gravity than a colorless conductive fluid, so as to be disposed under the colorless conductive fluid. When light is incident to an upper substrate, the light may pass through the colorless conductive fluid and then be reflected by the colored non-conductive fluid, thereby realizing a color. Thus, the light may be absorbed into the colorless conductive fluid, and the light reflected by the colored non-conductive fluid may be refracted by the colorless conductive fluid. The reflected lights may be mixed to reduce resolution of an image, reflectivity, and color reproduction range of the electro-wetting display device.

On the other hand, according to embodiments of the inventive concept, the colored non-conductive fluid 25 is disposed on the colorless conductive fluid 23. Thus, if light is incident to the upper substrate 31, the light is reflected from the colored non-conductive fluid 25 without refraction and absorption caused by the colorless conductive fluid 23. Thus, the color of the colored non-conductive fluid 25 may be shown.

Figure 3:
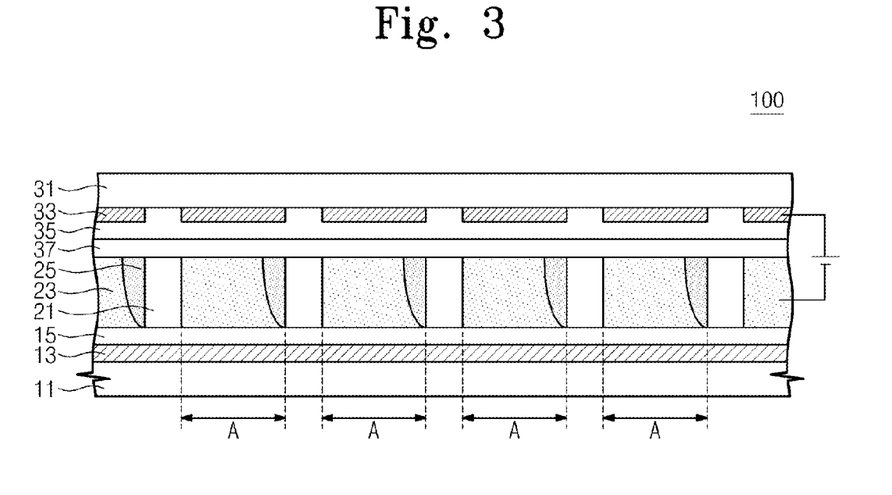
FIG. 3 is a cross-sectional view for explaining driving of an electro-wetting display device according to some embodiments of the inventive concept.
Figure 4:
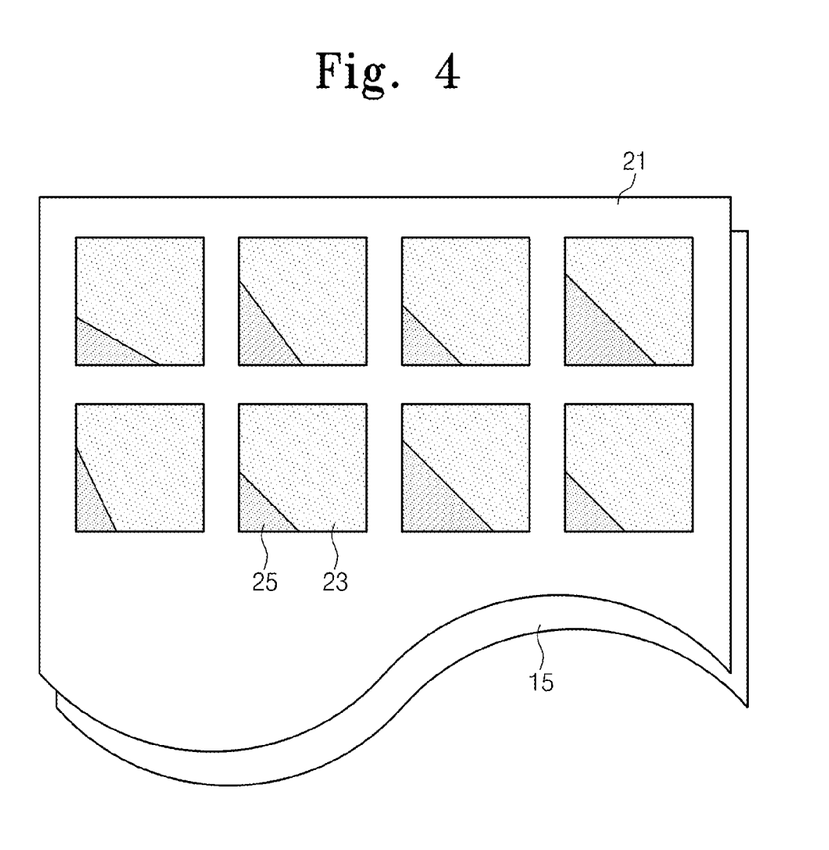
FIG. 4 is a plan view for explaining driving of an electro-wetting display device according to some embodiments of the inventive concept.

FIG. 3 is a cross-sectional view for explaining driving of an electro-wetting display device according to some embodiments of the inventive concept. FIG. 4 is a plan view for explaining driving of an electro-wetting display device according to some embodiments of the inventive concept.

Referring to FIGS. 3 and 4, a voltage may be applied between the lower electrode 13 and the upper electrode 33. In more detail, a voltage of 0 volt may be applied to the lower electrode 13, and a positive or negative voltage may be applied to the upper electrode 33. When the voltage is applied between the lower electrode 13 and the upper electrode 33, the colorless conductive fluid 23 may have conductibility. Thus, the colorless conductive fluid 23 may be moved toward the upper electrode 33 having polarity and then come in contact with the hydrophobic insulating layer 37. The colored non-conductive fluid 25 in contact with the hydrophobic insulating layer 37 may contract or be divided into small particles and/or drops, so as to be moved to surfaces of the hydrophilic partitions 21. As a result, the light incident to the upper substrate 31 may be absorbed into the colorless conductive fluid 23, so that the electro-wetting display device 100 may display a white color.

The pixel regions A defined by the hydrophilic partitions 21 may be driven independently from each other in the electro-wetting display device 100. In the electro-wetting display device 100, the pixel region A not applied with the voltage between the lower and upper electrodes 13 and 33 may display the color of the colored non-conductive fluid 25 due to the colored non-conductive fluid 25 in contact with the hydrophobic insulating layer 37, and the pixel region A applied with the voltage may display the white color due to the colorless conductive fluid 23 in contact with the hydrophobic insulating layer 37.

Figure 5:
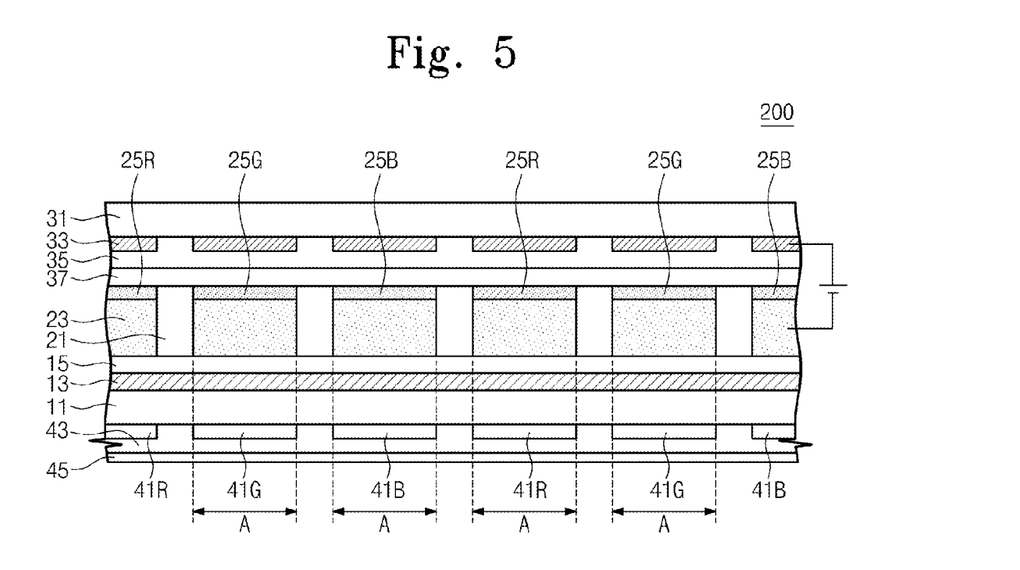
FIG. 5 is a cross-sectional view illustrating an electro-wetting display device according to other embodiments of the inventive concept.

FIG. 5 is a cross-sectional view illustrating an electro-wetting display device according to other embodiments of the inventive concept.

Referring to FIG. 5, an electro-wetting display device 200 according to the present embodiment may include a lower substrate 11 and an upper substrate 31 spaced apart from the lower substrate 11. A lower electrode 13 and a lower insulating layer 15 may be sequentially stacked on a top surface of the lower substrate 11. Color light emitting elements 41R, 41G, and 41B may be disposed on a bottom surface of the lower substrate 11. An upper electrode 33 may be disposed on a bottom surface of the upper substrate 31, and a hydrophobic insulating layer 37 may be disposed under the upper electrode 33. An upper insulating layer 35 may be disposed between the upper electrode 33 and the hydrophobic insulating layer 37. The lower insulating layer 15 and the upper insulating layer 35 may respectively cover the lower electrode 13 and the upper electrode 33 for electrical interruption of the lower electrode 13 and the upper electrode 33. Hydrophilic partitions 21 defining pixel regions A may be disposed to be spaced apart from each other by equal intervals between the lower insulating layer 15 and the hydrophobic insulating layer 37. Each of the pixel regions A may be a crossing region of the lower electrode 13 and the upper electrode 33. Each of the pixel regions A may be filled with a colorless conductive fluid 23 and a colored non-conductive fluid 25R, 25G, or 25B having a smaller specific gravity than the colorless conductive fluid 23.

Each of the lower substrate 11 and the upper substrate 31 may be a transparent glass substrate or a transparent plastic substrate.

The upper electrode 33 may be disposed on a portion of the bottom surface of the upper substrate 31 which corresponds to each of the pixel regions A. The lower and upper electrodes 13 and 33 may be formed of a transparent conductive material. For example, the lower and upper electrodes 31 and 33 may be formed of at least one of ITO, ZnO:Al, ZnO:Ga, $SnO_2$:F, a conductive polymer, and carbon nanotube (CNT).

The lower and upper insulating layers 15 and 35 may be formed of a transparent organic material or a transparent inorganic material. For example, the transparent organic material may be a polymer including at least one of polyimide, polyacrylate, polyxylene, polystyrene, polyamide, polysiloxane, fluorocarbonresin, and polyvinylchloride. For example, the transparent inorganic material may include at least one of SiC, SiON, SiO, AlO, SiN, and AlON.

Since the hydrophobic insulating layer 37 is in contact with the colored non-conductive fluids 25R, 25G, and 25B, the hydrophobic insulating layer 37 may have an interface property similar to those of the colored non-conductive fluids 25R, 25G, and 25B. The hydrophobic insulating layer 37 may be formed of a fluorine-based polymer. For example, the fluorine-based polymer may include at least one of poly(tetrafluoroethylene), poly(trifluoroethylene), and poly(difluoroethylene).

Each of the hydrophilic partitions 21 may have a thickness within a range of about 2 μm to about 100 μm. A shape and a height of each of the hydrophilic partitions 21 may be variously formed as the need arises. The hydrophilic partitions 21 may be formed of a hydrophilic material. For example, the hydrophilic partitions 21 may be formed of a polymer including at least one of epoxy resin, polyvinyl alcohol, polyvinyl Acetate, polyvinyl pyrrolidone, cellulose, and polyacrylate. A polymer thin layer including the above polymer may be formed on the hydrophobic insulating layer 37 and then a lithography process may be performed on the polymer thin layer to form the hydrophilic partitions 21. At least one initiator and a thermal hardener may be added to reactive monomers and reactive oligomers of the polymer thin layer in the lithography process. The at least one initiator may include a photo initiator, a thermal initiator, and an initiator for oxidation-reduction reaction.

The colorless conductive fluid 23 and the colored non-conductive fluid 25R, 25G, or 25B may not be mixed with each other. In other words, the colorless conductive fluid 23 may be separated from the colored non-conductive fluid 25R, 25G, or 25B with an interface therebetween. Since each of the colored non-conductive fluids 25R, 25G, and 25B has the smaller specific gravity than the colorless conductive fluid 23, the colored non-conductive fluid 25R, 25G, or 25B may be disposed on the colorless conductive fluid 23 and be in contact with the hydrophobic insulating layer 37. Since the hydrophilic partitions 21 are formed of the hydrophilic material, the interface between the colored non-conductive fluid 25R, 25G, or 25B and the colorless conductive fluid 23 may be substantially flat without a bend when the colored non-conductive fluid 25R, 25G, or 25B is disposed on the colorless conductive fluid 23. If the partitions 21 are formed of a hydrophobic material, an interface between the colorless conductive fluid 23 and the colored non-conductive fluid 25R, 25G, or 25B may be winding since a hydrophobic partition and the colorless conductive fluid 23 do not have interface affinity therebetween.

The colorless conductive fluid 23 may be transparent. Each of the colored non-conductive fluids 25R, 25G, and 25B may have one of a red color (R), a green color (G), and a blue color (B) by adding an artificial dye or a natural dye thereto. In more detail, a red non-conductive fluid 25R, a green non-conductive fluid 25G, and a blue non-conductive fluid 25B may fill three pixel regions A adjacent to each other, respectively. The three pixel regions A filled with the red, green, and blue non-conductive fluids 25R, 25G, and 25B may constitute a pixel group. The pixel regions A in the electro-wetting display device 200 may be divided into a plurality of the pixel groups.

The colorless conductive fluid 23 may include a polar inorganic fluid or a polar organic fluid. The polar inorganic fluid may be deionized water including an electrolyte material. The electrolyte material may include one of KCl, HCl, NaCl, $HNO_3$, NaOH, $Ch_3COOK$, $Ba(OH)_2$, $CuSO_4$, $H_2S$, $H_2CO_3$, $HgCl_2$, $CH_3COOH$, $H_2SO_4$, and KOH. The polar organic material may be a mixed fluid of a polar organic solvent and a lithium-salt-based material. The polar organic solvent may be one of ethylene carbonate, propylene carbonate, dimethyl carbonate, and diethyl carbonate.

The color light emitting elements 41R, 41G, and 41B may be disposed to correspond to the colored non-conductive fluids 25R, 25G, and 25B, respectively. For example, the color light emitting elements 41R, 41G, and 41B may be overlapped with the colored non-conductive fluids 25R, 25G, and 25B, respectively. The color light emitting elements 41R, 41G, and 41B may emit lights having the same colors as the colored non-conductive fluid 25R, 25G, and 25B, respectively. For example, a red light emitting element 41R may be disposed to correspond to the pixel region A filled with the red non-conductive fluid 25R. The color light emitting elements 41R, 41G, and 41B may be organic light emitting diodes, light emitting diodes, or cold cathode fluorescent lamps (CCFL).

The electro-wetting display device 200 may display an image in an electro-wetting manner in a bright place. Alternatively, the electro-wetting display device 200 may display an image by the color light emitting elements 41R, 41G, and 41B in a dark place. For example, the color light emitting elements 41R, 41G, and 41B may be turned-off and the electrodes 13 and 33 of the electro-wetting display device 200 may be operated to display the image in the bright place. Alternatively, the electrodes 13 and 33 of the electro-wetting display device 200 may be turned-off and the color light emitting elements 41R, 41G, and 41B may be driven to display the image in the dark place. Thus, the electro-wetting display device 200 can display the image regardless of an environment condition thereof. Additionally, the electro-wetting display device 200 may change a display mode according to the environment condition, so that the power consumption of the electro-wetting display device 200 may be reduced.

The lower electrode 13 may be connected to a ground electrode (not shown). The upper electrode 33 may be electrically connected to the colorless conductive fluid 23. A voltage may be applied between the lower electrode 13 and the upper electrode 33. In more detail, a voltage of 0 volt may be applied to the lower electrode 13, and a positive or negative voltage may be applied to the upper electrode 33. When the voltage is not applied between the lower electrode 13 and the upper electrode 33, the colored non-conductive fluids 25R, 25G, and 25B may be in contact with the hydrophobic insulating layer 37 and be disposed on the colorless conductive fluids 23. Thus, light incident to the upper substrate 31 may be reflected by the colored non-conductive fluids 25R, 25G, and 25B to display the colors of the colored non-conductive fluids 25R, 25G, and 25B filling the pixel regions A.

Additionally, a reflecting plate 45 may be disposed under the color light emitting elements 41R, 41G, and 41B, and an adhesive layer 43 may be disposed between the reflecting plate 45 and the color light emitting elements 41R, 41G, and 41B. The adhesive layer 43 may bond the reflecting plate 45 to the color light emitting elements 41R, 41G, and 41B. Light passing through the colored non-conductive fluids 25R, 25G, and 25B may be reflected by the reflecting plate 45, so that the colors of the colored non-conductive fluids 25R, 25G, and 25B may be displayed.

Alternatively, when the voltage is applied between the lower electrode 13 and the upper electrode 33, the colorless conductive fluid 23 having polarity may come in contact with the hydrophobic insulating layer 37, and the colored non-conductive fluids 25R, 25G, and 25B may contract or be divided into small particles and/or drops, so as to be moved to surfaces of the hydrophilic partitions 21. Thus, the light incident to the upper substrate 31 may be absorbed into the colorless conductive fluid 23, so that the electro-wetting display device 200 may display a white color.

The pixel regions A of the electro-wetting display device 200 may be driven independently from each other. For example, if the voltage is not applied to two pixel regions A in a middle region of the electro-wetting display device 200, the two pixel regions A may display the blue color and the green color, respectively. Alternatively, the voltage may be applied to other pixel regions A except the two pixel regions A, so that other pixel regions applied with the voltage may display the white color.

Figure 6:
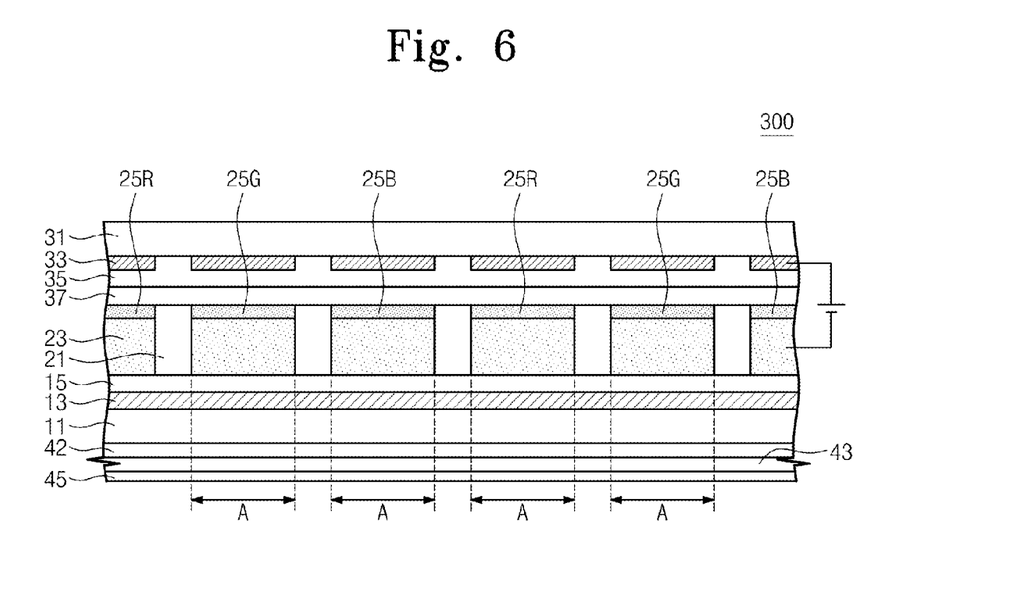
FIG. 6 is a cross-sectional view illustrating an electro-wetting display device according to still other embodiments of the inventive concept.

FIG. 6 is a cross-sectional view illustrating an electro-wetting display device according to still other embodiments of the inventive concept.

Referring to FIG. 6, an electro-wetting display device 300 according to the present embodiment may include a lower substrate 11 and an upper substrate 31 spaced apart from the lower substrate 11. A lower electrode 13 and a lower insulating layer 15 may be sequentially stacked on a top surface of the lower substrate 11. A white light emitting element 42 may be disposed on a bottom surface of the lower substrate 11. An upper electrode 33 may be disposed on a bottom surface of the upper substrate 31. A hydrophobic insulating layer 37 may be disposed under the upper electrode 33. An upper insulating layer 35 may be disposed between the upper electrode 33 and the hydrophobic insulating layer 37. The lower insulating layer 15 and the upper insulating layer 35 may respectively cover the lower electrode 13 and the upper electrode 33 for electrical interruption of the lower electrode 13 and the upper electrode 33. Hydrophilic partitions 21 defining pixel regions A may be disposed to be spaced apart from each other by equal intervals between the lower insulating layer 15 and the hydrophobic insulating layer 37. Each of the pixel regions A may be filled with a colorless conductive fluid 23 and a colored non-conductive fluid 25R, 25G, or 25B having a smaller specific gravity than the colorless conductive fluid 23.

Each of the lower substrate 11 and the upper substrate 31 may be a transparent glass substrate or a transparent plastic substrate.

The upper electrode 33 may be disposed on a portion of the bottom surface of the upper substrate 31 which corresponds to each of the pixel regions A. The lower and upper electrodes 13 and 33 may be formed of a transparent conductive material. For example, the lower and upper electrodes 31 and 33 may be formed of at least one of ITO, ZnO:Al, ZnO:Ga, $SnO_2$:F, a conductive polymer, and carbon nanotube (CNT).

The lower and upper insulating layers 15 and 35 may be formed of a transparent organic material or a transparent inorganic material. For example, the transparent organic material may be a polymer including at least one of polyimide, polyacrylate, polyxylene, polystyrene, polyamide, polysiloxane, fluorocarbonresin, and polyvinylchloride. For example, the transparent inorganic material may include at least one of SiC, SiON, SiO, AlO, SiN, and AlON.

Since the hydrophobic insulating layer 37 is in contact with the colored non-conductive fluids 25R, 25G, and 25B, the hydrophobic insulating layer 37 may have an interface property similar to those of the colored non-conductive fluids 25R, 25G, and 25B. The hydrophobic insulating layer 37 may be formed of a fluorine-based polymer. For example, the fluorine-based polymer may include at least one of poly(tetrafluoroethylene), poly(trifluoroethylene), and poly(difluoroethylene).

Each of the hydrophilic partitions 21 may have a thickness within a range of about 2 μm to about 100 μm. A shape and a height of each of the hydrophilic partitions 21 may be variously formed as the need arises. The hydrophilic partitions 21 may be formed of a hydrophilic material. For example, the hydrophilic partitions 21 may be formed of a polymer including at least one of epoxy resin, polyvinyl alcohol, polyvinyl Acetate, polyvinyl pyrrolidone, cellulose, and polyacrylate. A polymer thin layer including the above polymer may be formed on the hydrophobic insulating layer 37 and then a lithography process may be performed on the polymer thin layer to form the hydrophilic partitions 21. At least one initiator and a thermal hardener may be added to reactive monomers and reactive oligomers of the polymer thin layer in the lithography process. The at least one initiator may include a photo initiator, a thermal initiator, and an initiator for oxidation-reduction reaction.

The colorless conductive fluid 23 and the colored non-conductive fluid 25R, 25G, or 25B may not be mixed with each other. In other words, the colorless conductive fluid 23 may be separated from the colored non-conductive fluid 25R, 25G, or 25B with an interface therebetween. Since each of the colored non-conductive fluids 25R, 25G, and 25B has the smaller specific gravity than the colorless conductive fluid 23, the colored non-conductive fluid 25R, 25G, or 25B may be disposed on the colorless conductive fluid 23 and be in contact with the hydrophobic insulating layer 37. The colorless conductive fluid 23 may be transparent. Each of the colored non-conductive fluids 25R, 25G, and 25B may have one of a red color (R), a green color (G), and a blue color (B) by adding an artificial dye or a natural dye thereto. In more detail, a red non-conductive fluid 25R, a green non-conductive fluid 25G, and a blue non-conductive fluid 25B may fill three pixel regions A adjacent to each other, respectively. The three pixel regions A filled with the red, green, and blue non-conductive fluids 25R, 25G, and 25B may constitute a pixel group. The pixel regions A in the electro-wetting display device 300 may be divided into a plurality of the pixel groups.

The colorless conductive fluid 23 may include a polar inorganic fluid or a polar organic fluid. The polar inorganic fluid may be deionized water including an electrolyte material. The electrolyte material may include one of KCl, HCl, NaCl, $HNO_3$, NaOH, $Ch_3COOK$, $Ba(OH)_2$, $CuSO_4$, $H_2S$, $H_2CO_3$, $HgCl_2$, $CH_3COOH$, $H_2SO_4$, and KOH. The polar organic material may be a mixed fluid of a polar organic solvent and a lithium-salt-based material. The polar organic solvent may be one of ethylene carbonate, propylene carbonate, dimethyl carbonate, and diethyl carbonate.

The white light emitting element 42 may include an organic light emitting diode, a light emitting diode, or a cold cathode fluorescent lamp (CCFL).

The electro-wetting display device 300 may display an image in an electro-wetting manner in a bright place. Alternatively, the electro-wetting display device 300 may display an image by the white light emitting element 42 in a dark place. For example, the white light emitting elements 42 may be turned-off and the electrodes 13 and 33 of the electro-wetting display device 300 may be operated to display the image in the bright place. In the dark place, the white light emitting element 42 and the electrodes 13 and 33 of the electro-wetting display device 300 may be operated to display the image. At this time, the colored non-conductive fluids 25R, 25G, and 25B may be used as color filters. Thus, the electro-wetting display device 300 can display the image regardless of an environment condition. Additionally, the electro-wetting display device 300 may change a display mode according to the environment condition, so that the power consumption of the electro-wetting display device 300 may be reduced.

The lower electrode 13 may be connected to a ground electrode (not shown). The upper electrode 33 may be electrically connected to the colorless conductive fluid 23. A voltage may be applied between the lower electrode 13 and the upper electrode 33. In more detail, a voltage of 0 volt may be applied to the lower electrode 13, and a positive or negative voltage may be applied to the upper electrode 33. When the voltage is not applied between the lower electrode 13 and the upper electrode 33, the colored non-conductive fluids 25R, 25G, and 25B may be in contact with the hydrophobic insulating layer 37 and be disposed on the colorless conductive fluids 23. Thus, light incident to the upper substrate 31 may be reflected by the colored non-conductive fluids 25R, 25G, and 25B to display the colors of the colored non-conductive fluids 25R, 25G, and 25B filling the pixel regions A.

Additionally, a reflecting plate 45 may be disposed under the white light emitting device 42, and an adhesive layer 43 may be disposed between the reflecting plate 45 and the white light emitting device 42. Light passing through the colored non-conductive fluids 25R, 25G, and 25B may be reflected by the reflecting plate 45, so that the colors of the colored non-conductive fluids 25R, 25G, and 25B may be displayed.

In the dark place, the colored non-conductive fluids 25R, 25G, and 25B may function as the color filters. For example, if the voltage is not applied between the lower electrode 13 and the upper electrode 33, the white light emitted from the white light emitting element 42 may pass through the colored non-conductive fluids 25R, 25G, and 25B, such that the light passing through the colored non-conductive fluids 25R, 25G, and 25B may have the colors. As a result, the pixel region A not applied with the voltage may display the color of the colored non-conductive fluid 25R, 25G, or 25B thereof.

Alternatively, when the voltage is applied between the lower electrode 13 and the upper electrode 33, the colorless conductive fluid 23 may come in contact with the hydrophobic insulating layer 37, and the colored non-conductive fluids 25R, 25G, and 25B may contract or be divided into small particles and/or drops, so as to be moved to surfaces of the hydrophilic partitions 21. Thus, the light incident to the upper substrate 31 may be absorbed into the colorless conductive fluid 23, so that the electro-wetting display device 300 may display a white color.

In the dark place, the pixel region A applied with the voltage may display the white color by the white light emitted from the white light emitting element 42 and passing through the colorless conductive fluid 23.

The pixel regions A of the electro-wetting display device 300 may be driven independently from each other. For example, if the voltage is not applied to two pixel regions A in a middle region of the electro-wetting display device 300, the two pixel regions A may display the blue color and the green color, respectively. Alternatively, the voltage may be applied to other pixel regions A except the two pixel regions A, so that other pixel regions applied with the voltage may display the white color.

In the electro-wetting display device according to some embodiments of the inventive concept, the colored non-conductive fluid has the smaller specific gravity than the colorless conductive fluid. Thus, the colored non-conductive fluid may be disposed on the colorless conductive fluid. As a result, the light incident to the upper substrate may be reflected by the colored non-conductive fluid without absorption and refraction in the colorless conductive fluid. Thus, it is possible to improve the resolution of the image, the reflectivity, and the color reproduction range of the electro-wetting display device.

Additionally, the electro-wetting display device may further include the light emitting element. Thus the electrode wetting display device may display the image in the electro-wetting manner in the bright place and may display the image by the light emitting element in the dark place. Thus, the electro-wetting display device can display the image regardless of the environment condition thereof. Additionally, the electro-wetting display device may change the display mode according to the environment condition, so that the power consumption of the electro-wetting display device may be reduced.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. An electro-wetting display device comprising:
    an upper structure and a lower structure opposite to each other;
    a hydrophobic insulating layer covering a bottom surface of the upper structure;
    hydrophilic partitions disposed between the hydrophobic insulating layer and the lower structure to define pixel regions; and
    a colorless conductive fluid and a colored non-conductive fluid filling each of the pixel regions,
    wherein a specific gravity of the colored non-conductive fluid is smaller than a specific gravity of the colorless conductive fluid, and
    wherein the colorless conductive fluid is deionized water including an electrolyte.

2. The electro-wetting display device of claim 1, wherein the lower structure includes a lower substrate, a lower electrode disposed on a top surface of the lower substrate, and a lower insulating layer covering the lower electrode on the top surface of the lower substrate;
    wherein the upper structure includes an upper substrate, an upper electrode disposed on a bottom surface of the upper substrate, and an upper insulating layer covering the upper electrode on the bottom surface of the upper substrate; and
    wherein the lower insulating layer of the lower structure and the upper insulating layer of the upper structure face each other.

3. The electro-wetting display device of claim 2, wherein the upper electrode is disposed to correspond to each of the pixel regions.

4. The electro-wetting display device of claim 2, further comprising:
    a light emitting element disposed on a bottom surface of the lower substrate; and
    a reflecting plate under the light emitting element,
    wherein the colored non-conductive fluid in each of the pixel regions has one of a red color, a green color, and a blue color.

5. The electro-wetting display device of claim 4, further comprising:
    an adhesive layer disposed between the light emitting element and the reflecting plate.

6. The electro-wetting display device of claim 4, wherein the light emitting element is disposed to correspond to the colored non-conductive fluid in each of the pixel regions; and
    wherein the light emitting element has the same color as the colored non-conductive fluid corresponding thereto.

7. The electro-wetting display device of claim 4, wherein the light emitting element is a color light emitting element.

8. The electro-wetting display device of claim 4, wherein the light emitting element is a white light emitting element.

9. The electro-wetting display device of claim 1, wherein the electrolyte includes one of $KCl$, $HCl$, $NaCl$, $HNO_3$, $NaOH$, $Ch_3COOK$, $Ba(OH)_2$, $CuSO_4$, $H_2S$, $H_2CO_3$, $HgCl_2$, $CH_3COOH$, $H_2SO_4$, and $KOH$.

10. The electro-wetting display device of claim 1, wherein the colored non-conductive fluid is oil including an artificial dye or a natural dye.

11. The electro-wetting display device of claim 1, wherein the hydrophilic partitions are formed of at least one of epoxy resin, polyvinyl alcohol, polyvinyl Acetate, polyvinyl pyrrolidone, cellulose, and polyacrylate.

12. An electro-wetting display device comprising:
    an upper structure and a lower structure opposite to each other;
    a hydrophobic insulating layer covering a bottom surface of the upper structure;
    hydrophilic partitions disposed between the hydrophobic insulating layer and the lower structure to define pixel regions; and
    a colorless conductive fluid and a colored non-conductive fluid filling each of the pixel regions,
    wherein a specific gravity of the colored non-conductive fluid is smaller than a specific gravity of the colorless conductive fluid, and
    wherein the colorless conductive fluid includes a mixed fluid of a polar organic solvent and a lithium-salt-based material.

13. The electro-wetting display device of claim 12, wherein the polar organic solvent includes one of ethylene carbonate, propylene carbonate, dimethyl carbonate, and diethyl carbonate.

14. An electro-wetting display device comprising:
a light emitting element;
a lower structure disposed on the light emitting element, the lower structure including a lower substrate, a lower electrode disposed on the lower substrate, and a lower insulating layer covering the lower electrode;
an upper structure opposite to the lower structure, the upper structure including an upper substrate disposed on an upper electrode, and an upper insulating layer covering the upper electrode;
hydrophilic partitions disposed between the lower structure and the upper structure and defining pixel regions; and
a colorless conductive fluid and a colored non-conductive fluid filling each of the pixel regions;
wherein the colorless conductive fluid is at least deionized water including an electrolyte or is a mixed fluid including a polar organic solvent and a lithium-salt-based material.

15. The electro-wetting display device of claim 14, wherein the colored non-conductive fluid has a smaller specific gravity than the colorless conductive fluid.

16. The electro-wetting display device of claim 14, wherein the hydrophilic partitions are formed of at least one of epoxy resin, polyvinyl alcohol, polyvinyl Acetate, polyvinyl pyrrolidone, cellulose, and polyacrylate.

17. The electro-wetting display device of claim 14, wherein the light emitting element is a color light emitting element.

18. The electro-wetting display device of claim 14, wherein the light emitting element is a white light emitting element.

* * * * *